UNITED STATES PATENT OFFICE.

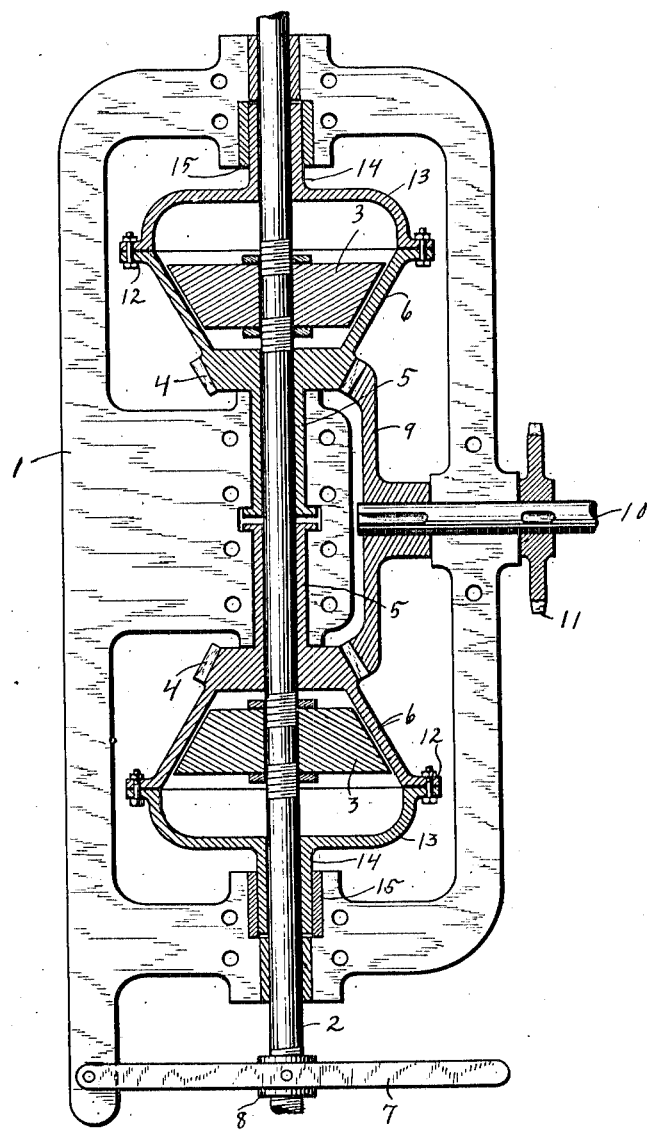

ADOLPH N. MILLER, OF MILWAUKEE, WISCONSIN, ASSIGNOR TO MILWAUKEE LOCOMOTIVE MFG. CO., OF MILWAUKEE, WISCONSIN, A CORPORATION OF WISCONSIN.

TRANSMISSION-GEARING.

1,096,638. Specification of Letters Patent. Patented May 12, 1914.

Application filed March 6, 1909. Serial No. 481,575.

*To all whom it may concern:*

Be it known that I, ADOLPH N. MILLER, residing in Milwaukee, in the county of Milwaukee and State of Wisconsin, have invented new and useful Improvements in Transmission-Gearing, of which the following is a description, reference being had to the accompanying drawings, which are a part of this specification.

My invention consists in certain peculiarities of construction and combination of parts hereinafter set forth with reference to the accompanying drawing and subsequently claimed, its object being to provide simple, positive, and durable gearing, the arrangement and construction of which is such that motion in one direction from a power-shaft is quickly and positively transmitted to a counter-shaft in either direction, the gearing being in constant mesh.

The drawing represents a sectional plan view of a transmission gearing embodying the features of my invention, the parts being shown in position wherein the power-shaft gearing is uncoupled from the counter.

Referring by numeral to the drawing, 1 indicates a frame, in bearings of which is mounted a power-shaft 2, the shaft being provided with oppositely disposed conical clutch members 3 that are secured to said shaft. Beveled pinions 4 are loosely mounted upon the shaft having collared sleeve extensions 5, which extensions are held against end-thrust by bearings of the frame located between the beveled pinions and collared ends of their respective sleeves. Each bevel pinion is provided with a rearwardly extending conical shell 6 into which are housed the clutch members 3, said clutch-members being arranged to be alternately forced into frictional engagement with the shells. Engagement of the clutch-members and shells is accomplished by means of a lever 7 fulcrumed to the frame 1 and in spanner-engagement with a grooved collar 8 fast on the power-shaft 2. By this construction it is apparent that when the power-shaft is moved longitudinally in either direction by the lever, from the position shown in the drawing, one or the other of the beveled pinion shells will be engaged by the adjacent clutch-member whereby a rotation of said pinions is effected. Meshing with both beveled pinions 4 is a beveled gear-wheel 9, which gear-wheel is secured to a counter-shaft 10, this shaft being mounted in bearings of the frame and carrying a toothed sprocket-wheel 11 for transmitting motion by a chain (not shown) to a vehicle-axle or any mechanism desired to be actuated.

From the foregoing described gearing, it is obvious that the power-shaft driven in one direction, will cause the counter-shaft to rotate in either direction at the will of the operator, or said counter-shaft may be disconnected from the power-shaft entirely, depending upon the position of the clutch-members, and when either pinion is operating to drive the aforesaid counter-shaft, the opposite pinion is idly rotated in a reverse direction by the gear-wheel, thus serving as a counter-balance.

It should be understood that in some instances, for the toothed beveled pinions and gear-wheel, friction-gears may be substituted, but in either instance the reversing mechanism is the same, which mechanism comprises the conical clutch members and their conical shells or housing carried by the beveled pinions.

The conical shells 6 are provided with flanged portions 12 to which are connected extension portions 13 provided with hubs 14. These hub portions surround the shaft and have bearings 15 in the main frame 1. The shaft openings in the hub portions are of larger diameter than the shaft 2 which passes freely therethrough and has its bearings in the frame beyond the bearings of the hub. By providing the conical shells with the extension portions the weight of the shells is carried by bearings on both ends of each shell thereby greatly increasing the wear and life of the parts.

What I claim as my invention is:

1. A transmission device, comprising a longitudinally movable power shaft, clutch members fixed thereon, oppositely positioned driving wheels surrounding the shaft and each driving wheel having a bearing upon the inner side of and upon the outer side of each clutch member, said driving wheels also provided with clutch portions positioned to be engaged by the clutch members fixed on the power shaft, a driven shaft and a driven wheel carried thereby in mesh with both driving wheels, and means for imparting longitudinal movement to the power shaft to move one or the other of the clutch members into engagement with one or the other clutch portions of the driving wheels to alternately change the direction of rotation of the driven shaft.

2. A transmission device, comprising a longitudinally movable power shaft, clutch members fixed thereon, oppositely positioned driving wheels loosely surrounding the shaft, the loosely surrounding portions of the driving wheels forming inner bearings for said wheels upon the shaft, outer bearings for the driving wheels rigidly fixed to said driving wheels so as to be non-movable longitudinally therewith, a driven shaft, and a driven wheel carried thereby in mesh with the driving wheels, and means for imparting longitudinal movement to the power shaft to move one or the other of the fixed clutch members into engagement with one or the other clutch members of the driving wheels to alternately change the direction of rotation of the driven shaft.

3. A transmission device, comprising a longitudinally movable power shaft, clutch members fixed thereon, oppositely positioned driving wheels loosely surrounding the shaft, the loosely surrounding portions of the driving wheels forming inner bearings for said wheels upon the shaft, and each driving wheel provided with an outwardly extending clutch member adapted to be engaged by the fixed clutch member adjacent thereto, an outer bearing for each driving wheel, each outer bearing consisting of a portion loosely surrounding the shaft, and a projection extending inwardly from said loosely surrounding portion and fixedly secured to the outwardly extending clutch member of the driving wheel adjacent thereto, a driven shaft, and a driven wheel carried thereby in mesh with the driving wheels, and means for imparting longitudinal movement to the power shaft to move one or the other of the fixed clutch members into engagement with one or the other clutch members of the driving wheels to alternately change the direction of rotation of the driven shaft.

In testimony whereof, I affix my signature, in presence of two witnesses.

ADOLPH N. MILLER.

Witnesses:
MATILDA MILLER,
R. H. WEILAND.